(No Model.) 3 Sheets—Sheet 2.

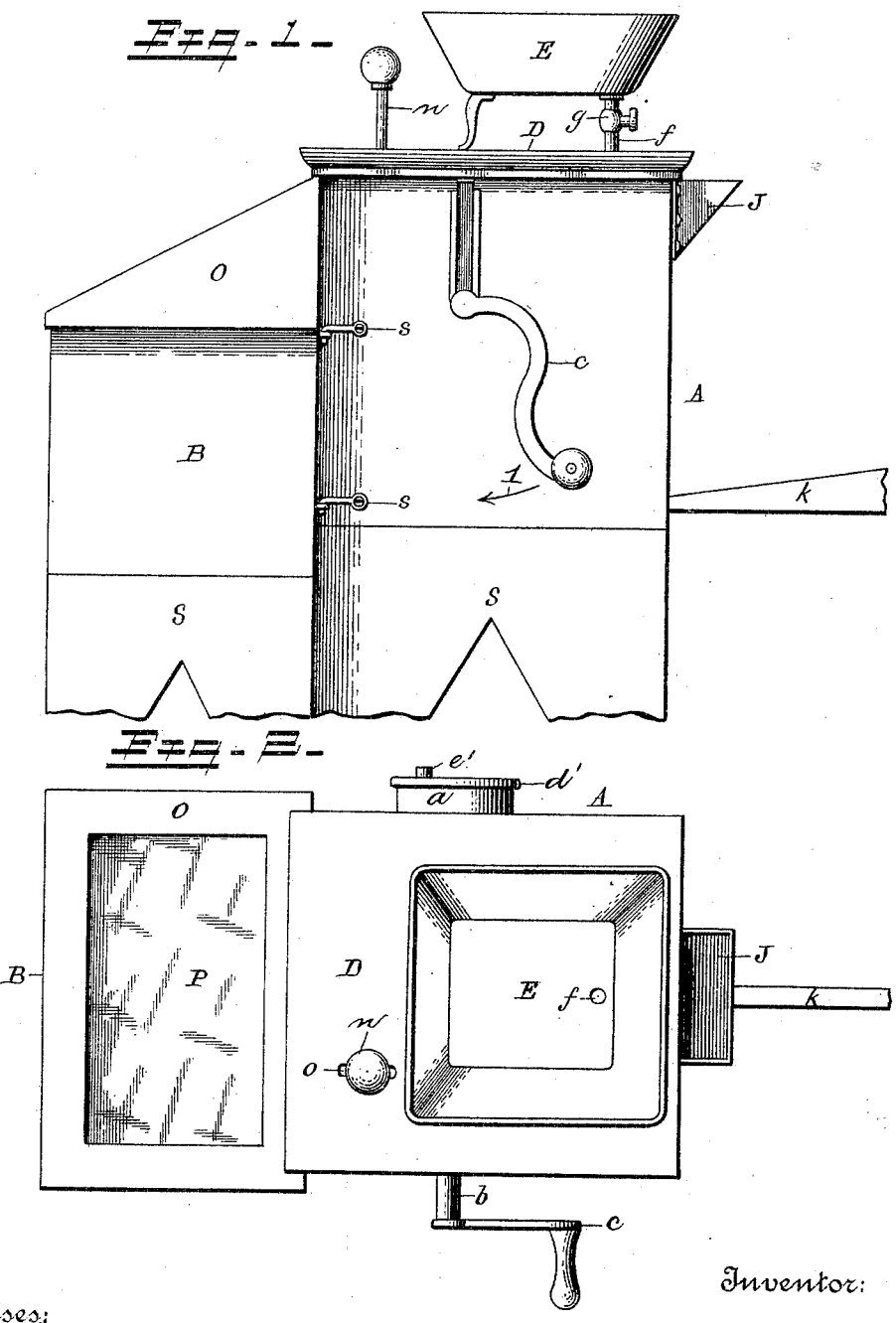

J. JORALEMON.
ICE CREAM FREEZER AND PACKER.

No. 491,650. Patented Feb. 14, 1893.

Witnesses:
Albert D. Blackwood
Carleton E. Snell

Inventor:
Joseph Joralemon
By his Attorneys,
J. H. Soule & Co.

THE NORRIS PETERS CO., PHOTO-LITHO., WASHINGTON, D. C.

(No Model.) 3 Sheets—Sheet 3.
J. JORALEMON.
ICE CREAM FREEZER AND PACKER.
No. 491,650. Patented Feb. 14, 1893.
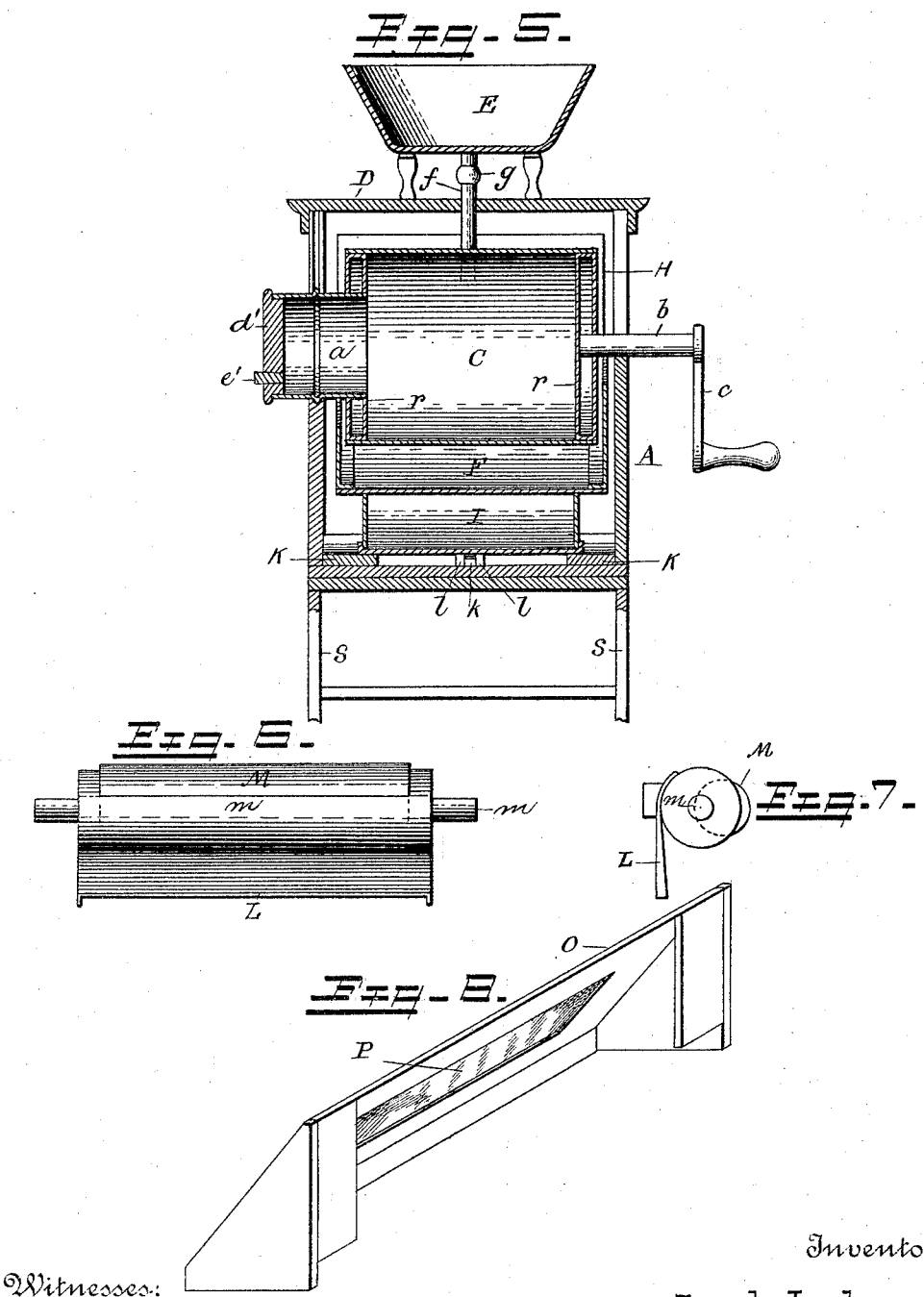
Witnesses:
Albert B. Blackwood
Carleton E. Snell
Inventor:
Joseph Joralemon
By his Attorneys,
J. H. Soulé & Co.

UNITED STATES PATENT OFFICE.

JOSEPH JORALEMON, OF TROY, PENNSYLVANIA.

ICE-CREAM FREEZER AND PACKER.

SPECIFICATION forming part of Letters Patent No. 491,650, dated February 14, 1893.

Application filed February 27, 1892. Serial No. 422,999. (No model.)

*To all whom it may concern:*

Be it known that I, JOSEPH JORALEMON, of Troy, in the county of Bradford and State of Pennsylvania, have invented certain new and useful Improvements in Ice-Cream Freezers and Packers, of which the following is a specification.

The invention relates to that class of ice-cream freezers wherein the cream to be frozen is brought in contact with and freezes upon the exterior surface of a rotating cylinder containing the freezing materials, the frozen cream being afterward scraped therefrom by means of a scraper suitably arranged for the purpose; and the invention consists in certain improved features of construction whereby such a freezer is rendered more effective in operation and more convenient in use.

The invention moreover includes an ice-cream packer of novel construction adapted to be used in connection with the freezer for the purpose of receiving the frozen cream and keeping it from exposure until the time when it is to be used.

The invention is illustrated in the accompanying drawings, wherein

Figure 3:
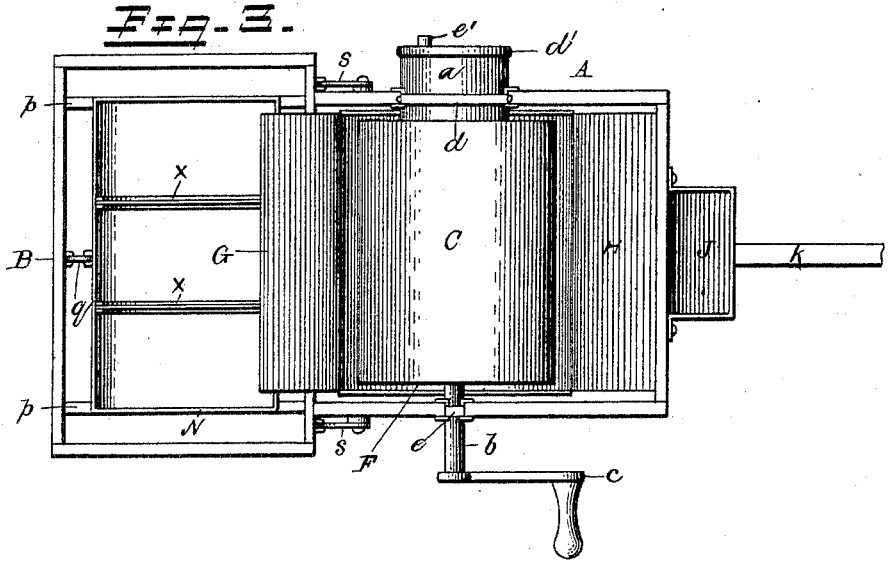
Figure 4:
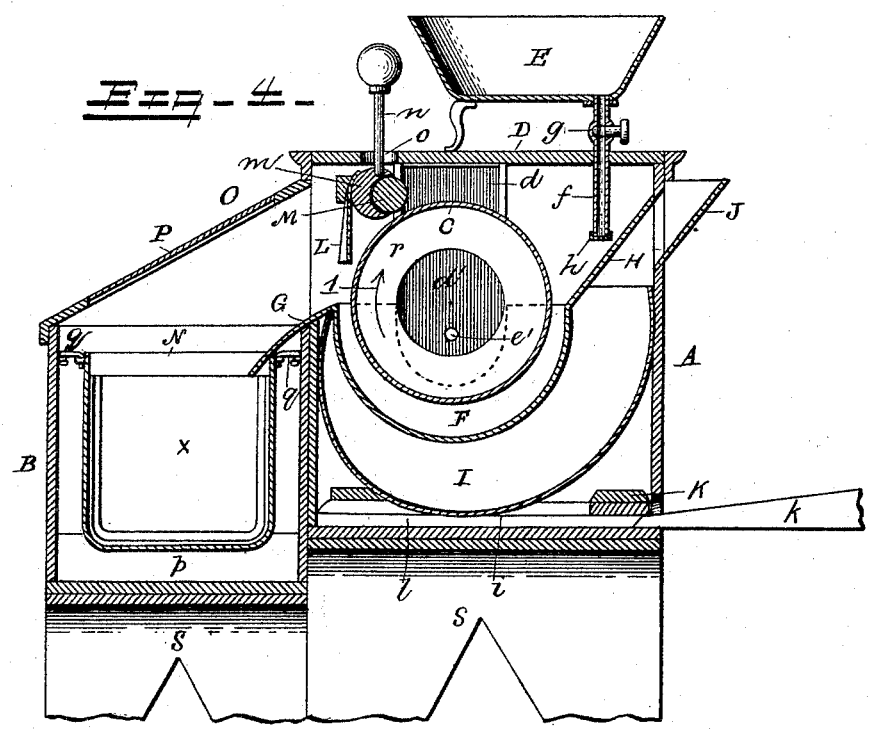

Figure 1, is a side view of the freezer and packer; Fig. 2, is a plan view of the same; Fig. 3, is a plan view with the covers removed; Fig. 4, is a central longitudinal section of the apparatus; Fig. 5, is a central vertical transverse section of the freezer; Figs. 6, and 7, are bottom and side views respectively of the scraper and its shaft; Fig. 8, is a perspective view of the cover of the packer.

In the drawings, A, is the freezer, and B is the packer.

The freezer A, consists of a rectangular wooden box or casing, inclosing a suitable receptacle for the cream, and a rotary metallic cylinder C, in connection therewith containing the refrigerant agent whereby the freezing of the cream is effected. The cylinder C, is journaled in opposite sides of the casing, having at one end the enlarged hollow trunnion $a$, through which the refrigerant is introduced, and having at the other end the trunnion $b$, carrying exterior to the casing the crank $c$, for rotating the cylinder. To enable the cylinder to be removed from the casing when required, each of the trunnions $a$, and $b$, is accommodated at the bottom of an elongated open slot extending down from the top edge of the casing, removable slides $d$, and $e$, being fitted in the slots above the trunnions $a$, $b$, respectively for excluding air when the freezer is in use. In Fig. 5, of the drawings these slides are omitted. The bearing of the hollow trunnion $a$, may be provided with a groove as shown (see Fig. 5) co-operating with an annular bead on the trunnion, to guide the cylinder in its rotation and to facilitate lubrication. The mouth of the hollow trunnion $a$, is closed by a removable cap or cover of any suitable material, or as shown by a wooden plug $d'$, fitting closely therein. In the cap, cover or plug $d'$, is a bung-hole for the letting off of brine from the cylinder, the bung-hole being provided with a bung or cork $e'$. Obviously a faucet might be conveniently used in place of the cork $e'$, for drawing off the brine.

The casing A, has a cover D, above which is arranged a cream-supply vessel E, into which the cream to be frozen is first poured, the cream being delivered therefrom to the bowl F, of a cream pan within the casing below the rotary cylinder C. A supply-pipe $f$, extends from the bottom of the vessel E, to the cream pan through an aperture in the cover D, and exterior to the casing the supply-pipe is provided with a valve controlled by a stop-cock $g$ for regulating the supply of cream to the cream pan. The pipe $f$, may be and preferably is provided with a strainer or filter $h$, either above the valve, or at its lower end as shown, so as to insure the purity of the cream which is admitted to the freezer.

The cream pan, to which cream is admitted from the supply vessel E, rests at the bottom of the casing A, and extends across the same from side to side. Its cream receptacle F, consists of a semi-cylindrical bowl or trough, substantially concentric with the cylinder C, and surrounding the lower portion of the cylinder at a short distance therefrom. The perpendicular ends of the cream receptacle extend upward between the ends of the rotary cylinder and the sides of the casing, and are cut away at their upper edges, as shown, to accommodate the trunnions $a$ $b$ of the cylinder. The curved bottom of the cream receptacle is extended forward to form the delivery apron G, and is extended rearward to form the guide-plate or shield H, which directs the flow of cream from the supply-pipe $f$, to the cream receptacle. The supply-pipe $f$, projects downward some distance below the cover D, and the plate or shield H, extends upward nearly to the top of the casing, so that as the cream is supplied through the pipe $f$, it is all conducted directly into the cream receptacle.

The location of the rotary cylinder C containing the refrigerant agent, with relation to the cream receptacle F, is calculated to greatly reduce the temperature of the cream in the receptacle, and, under favorable circumstances, to cause the cream to freeze upon the outer surface of the cylinder. As a matter of fact, however, the refrigerant in the cylinder cannot always be depended upon to effect the freezing of the cream, and for that reason it is necessary, in order to insure the efficiency of the apparatus, to make further provision for the refrigeration of the contents of the cream receptacle. This is done by introducing a portion of the refrigerant agent beneath the cream receptacle. As shown in the drawings, the cream pan is formed with an ice-chamber I, extending beneath the cream receptacle F, and constituting a permanent part of the cream pan. The ice-chamber I, is curved to conform to the shape of the cream receptacle F, and is trumpet-shaped in section, being tapering and closed at its forward end, and flaring open at its rear end to give access to its interior.

The edge of the open mouth of the ice-chamber occupies (when the cream pan is in position in the casing) a position close to the rear wall of the casing A; and immediately above the said open mouth of the ice-chamber is formed an aperture in the casing fitted with an ice-supply chute J, through which ice or other refrigerant material is introduced to the ice-chamber I, from without the casing. The guide-plate or shield H, projecting from the rim of the cream receptacle extends obliquely above the open mouth of the ice-chamber and reaches to the casing wall, thus serving as a cover or shield for the mouth of the ice-chamber. The shield H, prevents any possible entrance of the refrigerant into the cream receptacle or of the inflowing cream into the ice-chamber.

By the employment of the ice-chamber I, located directly beneath the cream receptacle, the cream can be subjected to the influence of the freezing agent from below as well as from the cylinder above, so that its proper congelation is insured. The effect of the refrigerant in the ice-chamber I is, not to freeze the cream in the cream receptacle, but just to reduce it nearly to the freezing point, so that when the rotary refrigerant cylinder C, rotates therein the cream will readily freeze upon the surface of the cylinder.

In order to prevent the cream from freezing upon the heads of the rotary cylinder C, where it could not be conveniently removed and where it would eventually interfere with the rotation of the cylinder, a special construction both of the cylinder and of the cream pan is adopted. In the first place the refrigerant within the cylinder is kept out of direct contact with the heads of the cylinder by providing the cylinder at each end with an auxiliary head $r$, thus leaving an air space at each end and preventing the outer heads of the cylinder from reaching so low a temperature as to effect the freezing of the cream thereupon. Moreover, the ice-chamber I, of the cream pan is made to terminate a short distance from each end of the cream receptacle F, at a point in substantially the same plane as each auxiliary head $r$, of the rotary cylinder. As a result of the described construction, the cream at the extreme end portions of the cream receptacle F, is not directly acted upon by the refrigerant either from above or from below, and the consequence is that the heads of the cylinder and the extreme margins of its curved perimeter are left entirely free and clean, and the frozen cream collects on the cylinder only on that portion of its surface which is between the auxiliary heads $r$, $r$, and which passes above the ice-chamber I, of the cream pan.

Ordinarily the bottom of the cream receptacle F, is a little below the lowest point of the cylinder C, but during the freezing operation the cream in the cream receptacle is kept at such a level that a segment of the cylinder is immersed therein. When, however, the freezing operation is to be discontinued, and no further cream is supplied through supply pipe $f$, the cream is gradually taken up from the cream receptacle by the rotating cylinder until the cream level falls below the path of the cylinder. This leaves a small quantity of cream at the bottom of the cream receptacle, and in order that this remaining cream may be also taken up the cream pan is so arranged that it may be raised toward the cylinder for this purpose when desired. This is accomplished in a very simple manner. The cream pan does not rest directly upon the bottom of the casing, but upon a movable frame K. Beneath the frame K, is a groove or channel $i$, in which slides a wedge-shaped push-bar $k$, projecting outwardly through an aperture in the back wall of the casing. When the push-bar is pulled out, the frame K, and the cream-pan occupy their normal lower positions, but when the push-bar is pushed in, the frame K, is raised (owing to the shape of the push-bar) thus raising the cream pan and bringing the bottom of the cream receptacle F, close up to the cylinder C. The groove $i$, in which push-bar $k$, slides either may be cut in the bottom of the casing or may be simply formed between strips $l$, $l$, nailed to the bottom of the casing as shown, upon which strips the frame K rests.

The front side or end of the casing A, is open from about its middle upward, in order to provide for the discharge of the frozen cream. The rotary cylinder C, within the casing is so located that its perimeter is not far from this front opening, while out over the lower margin of the opening (in front of and below the upper portion of the cylinder) extends the delivery apron G, of the cream pan. In order that the frozen cream which collects on the surface of the cylinder may be scraped off onto the delivery apron G, a scraper L is provided, carried by a rock-shaft m journaled in the sides of the casing, and adapted to be brought in contact with the rotating surface of the cylinder when desired. An operating lever n, is secured to the rock-shaft m, and extends through a guide slot o, in the cover D. of the casing. This lever, or else its manipulating knob, is made removable so as not to interfere with the lifting of cover D. The scraper L, is simply a strip or blade of sheet metal, as tin, secured to the rock-shaft m, and having a length equal, or nearly equal, to that of the rotary cylinder C. At its extremities the scraper L is forwardly bent or curved as shown, so as to assist in guiding or directing the discharge of the frozen cream onto the delivery apron G. The rock-shaft m, also carries a "grainer" M, which is merely a rotatable cylindrical shaft or roller, mounted in the rock-shaft, and designed to be brought into contact with the frozen cream on the cylinder C, for the purpose of rolling down the same so that it may be more readily scraped off. The graining roller M, is so positioned on the rock-shaft with respect to the scraper L, that when the grainer is in contact with the rotary cylinder C, the scraper will be out of contact therewith, and vice versa. In the normal position of the operating lever n of the rock-shaft, that is, in its central position in its guide slot, both the scraper and the grainer are out of contact with the rotary cylinder, but by moving the lever n in one direction the grainer is brought into play, while the scraper is rendered operative by moving said lever in the opposite direction. The rock-shaft m carrying the scraper and grainer may be, and preferably is, detachably journaled in the casing, so as to permit of its removal for cleaning, and so as to allow the cylinder and cream pan to be more readily removed from the casing.

The packer B, to which reference has been already made, is merely a box or receptacle adapted to receive the frozen cream as it is delivered from the freezer A. The packer is separable from the freezer, but when in use the packer is located directly in front of the freezer and adjacent thereto, with the open top of the packer occupying a plane coincident with the lower margin of the front opening of the freezer-casing A. Preferably both the freezer and the packer are provided with suitable legs or supports S, so as to bring the apparatus to a convenient altitude, and the packer may be secured in position against the freezer by suitable fastenings, such as the hooks and staples s s. The packer may be of any desired depth, and its lower portion may conveniently extend below the bottom of the freezer casing A, as shown.

The packer B, is provided with a removable hood or cover O, (shown in detail in Fig. 8) which fits closely upon the open top of the packer, but which is open on the side toward the freezer A, so as not to interfere with the delivery of cream to the packer. The hood O, not only protects the interior of the packer from the outer air and from dust, but it also serves as a cover for the front opening of the freezer A, since it fits closely against the front of the freezer and completely incloses the space between the front opening of the freezer and the mouth of the packer B. Preferably the inclined top of the hood O, is provided with a transparent glass panel P, through which the contents of the packer may be inspected without removing the hood O.

The packer consists of an outer wooden casing B, and a metallic packing-box N so arranged within said casing that a space is left between it and the casing on all sides. Into the packing box N, the frozen cream is received from the freezer, and the wooden casing B, and the open space surrounding the packing-box are provided so that ice may be placed around the packing-box to prevent the melting of the frozen cream therein. The packing-box rests upon brackets p, p, at the bottom of the casing B, so as to leave an ice-space under it, and is immovably secured in position within the casing by any suitable fastening devices q q.

The width of the packing-box N, is about equal to the width of the freezer casing A, which necessitates the somewhat greater width of the outer casing B, of the packer. When the packer is in position adjoining the freezer, the delivery apron G, of the cream pan F, within the freezer extends out from the front opening of the freezer-casing and curves over into the open mouth of the packing-box N, thus constituting a clear passage-way from the freezer to the packing-box, which bridges the ice-space of the packer and conducts the frozen cream directly into the packing-box N. The packing-box may be supplied with removable partitions x x, for dividing its interior into several separate compartments, so that after the frozen cream has been delivered to the packer the cream in the several compartments may be flavored independently, thus rendering possible a variety of flavors from a single freezing.

The foregoing description of the construction and purpose of the various features of the invention has rendered quite clear the operation of the apparatus. To begin with, the packer B, is placed in position against the freezer A, and secured thereto by the fastenings s s. Ice and salt (if such is the refrigerant employed) are then filled in around the packing-box N; the cream pan is put in place at the bottom of the freezer with the delivery apron G, entering the packing-box N; the rotary cylinder is filled with ice and salt, plugged, and inserted in its bearings, and the slides d e applied; the rock-shaft m, carrying the scraper and the grainer is put in place; the cover D, carrying supply-vessel E, and the hood O, are fitted upon the freezer and packer respectively; and the operating lever n of the scraper and grainer shaft is inserted through its slot. The ice-chamber I, of the cream pan is then supplied with ice and salt through the chute J, the cream to be frozen is poured into the supply vessel E, and, by manipulating the stop-cock g, a portion of the cream is supplied to the cream receptacle F, through supply-pipe f. Then the cylinder C, which is partially immersed in the contents of the cream receptacle, is slowly rotated (in the direction of the arrow 1) by means of the crank c. Owing to the combined action of the refrigerant in the rotary cylinder C, and the refrigerant in the ice-chamber I of the cream pan, the cream very soon begins to freeze and crystallize upon the surface of the cylinder, only a very few revolutions of the crank c being sufficient to effect the purpose. When a good layer of frozen cream has collected on the cylinder, the operating lever n, of the rock-shaft m, is moved for a moment to its backward position (while the crank c, is still being turned) to permit the grainer M to roll down the crystallized cream on the cylinder, thus making the layer of cream more dense and of a pasty consistency; and then the lever is moved forward to bring the scraper L, into contact with the cylinder. As the scraper is held against the still rotating cylinder, the frozen cream on the surface of the cylinder is scraped off and falls forward upon the delivery apron G, by which it is directed into the packing-box N, of the packer B. This freezing of the cream on the cylinder and scraping it off may be repeated if necessary, until the desired quantity of cream is frozen, the cream receptacle F, being kept supplied with cream from the cream-supply vessel E. When a sufficient amount of cream has been frozen and delivered to the packer B, and the receptacle F, is nearly empty, the push-bar k, is pushed in through its aperture at the bottom of the freezer-casing, thus raising the cream pan and permitting all the remaining cream in the cream receptacle F, to be taken up by the cylinder C. When this has been scraped off into the packer the freezing operation is completed.

If the ice-cream is to be immediately used, the hood or cover O, of the packer is removed, the ice-cream in the several divisions of the packing-box (if the partitions x x are used) is flavored separately as desired, and the cream, or such portion of it as is wanted, is taken from the packing-box. If any or all of the ice-cream is to be kept for subsequent use, the apparatus is left in position with the cover O, of the packing-box fitted in its place, and in that condition the cream can be kept for a long time since the ice lining the packer keeps the contents of the packing-box at a low temperature and prevents melting.

I claim as my invention:—

1. In combination with the rotary refrigerant cylinder of an ice-cream freezer, a cream receptacle substantially concentric with said cylinder into which said cylinder extends, and an ice-chamber located beneath said cream receptacle and formed to correspond with the shape thereof, substantially as set forth.

2. In combination with the rotary refrigerant cylinder of an ice-cream freezer, a cream pan beneath said cylinder comprising a cream receptacle into which said rotary cylinder extends and an ice-chamber below said cream receptacle, substantially as set forth.

3. A rotary refrigerant cylinder having auxiliary heads r r, in combination with a cream receptacle into which said rotary cylinder extends, and an ice-chamber of less width than said cream receptacle extending centrally beneath the same, substantially as set forth.

4. A rotary refrigerant cylinder C having auxiliary heads r r, in combination with a cream pan below said cylinder formed with a cream receptacle and an ice-chamber, the cream receptacle of said cream pan receiving the lower portion of said rotary cylinder, and the ice-chamber of said cream pan being of less width than said cream receptacle and extending centrally beneath the same, substantially as set forth.

5. In an ice-cream freezer having a rotary refrigerant cylinder, the casing A, in which said cylinder is journaled, the ice-chamber I, at the bottom of said casing, and a supply opening in said casing for supplying a refrigerant to said ice chamber, in combination with the cream receptacle F, above said ice-chamber and below the rotary refrigerant cylinder, and the guide-plate or shield H, extending upward from said cream receptacle and terminating at a point above said supply opening, substantially as set forth.

6. In an ice-cream freezer, the rotary refrigerant cylinder C, the cream-supply pipe f, and the scraper L, in combination with the cream receptacle F beneath said cylinder, the bottom of the cream receptacle being continued both rearwardly and forwardly to form the upwardly-extending guide-plate H adjacent to said cream supply, and the delivery apron G, below said scraper, substantially as set forth.

7. In combination with the rotary refrigerant cylinder of an ice-cream freezer, the grainer M and scraper L connected together and adapted to be brought alternately in contact with the surface of said cylinder, substantially as set forth.

8. The rotary refrigerant cylinder of an ice-cream freezer, in combination with the rock shaft m arranged adjacent to said cylinder and carrying the scraper L and the grainer M, and means for rocking said rock shaft, substantially as set forth.

9. The freezer-casing A, having a front opening therein for the discharge of frozen cream, and the separate packer B, arranged adjacent thereto with its open top below the top of said front opening in the freezer casing, in combination with the removable hood O, covering said packer, B, and fitting against and around said opening in the freezer casing, thus closing both the open top of said packer and the front opening of said freezer-casing but not obstructing communication between said freezer and packer, substantially as set forth.

In testimony whereof I affix my signature in presence of two witnesses.

JOSEPH JORALEMON.

Witnesses:
JACOB FINES,
DAVID BEARDSLEE.